United States Patent
Loh et al.

(10) Patent No.: US 8,738,877 B2
(45) Date of Patent: May 27, 2014

(54) PROCESSOR WITH GARBAGE-COLLECTION BASED CLASSIFICATION OF MEMORY

(75) Inventors: Gabriel H. Loh, Bellevue, WA (US); Mauricio Breternitz, Austin, TX (US)

(73) Assignee: Advance Micro Devices, Inc., Sunnyvale, CA (US)

( * ) Notice: Subject to any disclaimer, the term of this patent is extended or adjusted under 35 U.S.C. 154(b) by 103 days.

(21) Appl. No.: 13/325,727

(22) Filed: Dec. 14, 2011

(65) Prior Publication Data
US 2013/0159623 A1 Jun. 20, 2013

(51) Int. Cl.
*G06F 12/02* (2006.01)

(52) U.S. Cl.
CPC .................................. *G06F 12/0253* (2013.01)
USPC .......................................................... 711/165

(58) Field of Classification Search
CPC .................................................. G06F 12/0253
See application file for complete search history.

(56) References Cited

U.S. PATENT DOCUMENTS

| | | | |
|---|---|---|---|
| 6,052,699 A | 4/2000 | Huelsbergen et al. | |
| 6,081,665 A | 6/2000 | Nilsen et al. | |
| 6,253,215 B1 | 6/2001 | Agesen et al. | |
| 6,289,360 B1 | 9/2001 | Kolodner et al. | |
| 6,304,949 B1 | 10/2001 | Houlsdworth | |
| 6,317,756 B1 | 11/2001 | Kolodner et al. | |
| 6,317,872 B1 | 11/2001 | Gee et al. | |
| 6,327,701 B2 | 12/2001 | Ungar | |
| 6,349,312 B1 | 2/2002 | Fresko et al. | |
| 6,502,110 B1 | 12/2002 | Houldsworth | |
| 6,526,422 B1 | 2/2003 | Flood et al. | |
| 6,529,919 B1 | 3/2003 | Agesen et al. | |
| 6,658,652 B1 | 12/2003 | Alexander, III et al. | |
| 6,862,674 B2 | 3/2005 | Dice et al. | |
| 6,874,074 B1 | 3/2005 | Burton et al. | |
| 7,225,211 B1 | 5/2007 | Colgrove et al. | |
| 7,428,622 B2* | 9/2008 | Tulyani | 711/161 |
| 8,245,060 B2* | 8/2012 | Worthington et al. | 713/320 |
| 2006/0259728 A1 | 11/2006 | Chandrasekaran et al. | |
| 2007/0255909 A1 | 11/2007 | Gschwind et al. | |
| 2008/0172539 A1* | 7/2008 | Boss et al. | 711/165 |
| 2008/0235306 A1 | 9/2008 | Kim et al. | |
| 2011/0066767 A1 | 3/2011 | Hyde, II et al. | |
| 2011/0225346 A1 | 9/2011 | Goss et al. | |

FOREIGN PATENT DOCUMENTS

EP   1635264 A2   3/2006

OTHER PUBLICATIONS

International Search Report for International Application No. PCT/US2012/068762 dated Mar. 5, 2013.

* cited by examiner

*Primary Examiner* — Hiep Nguyen
(74) *Attorney, Agent, or Firm* — Park, Vaughan, Fleming & Dowler LLP

(57) ABSTRACT

Improved memory management in a processor is provided using garbage collection utilities. The processor includes higher performance memory units and lower performance memory units and a memory management unit. The memory management unit includes a garbage collection utility programmed to identify high use memory blocks and low use memory blocks within the higher and lower performance memory units. The memory management unit is also configured to move the high use memory blocks to higher performance memory and move the low use memory blocks to lower performance memory. The method comprises determining performance characteristics of available memory to identify higher performance memory and lower performance memory. Next memory block use metrics are analyzed to identify high use memory blocks and low use memory blocks. Finally, high use memory blocks are moved to the higher performance memory while the low use memory blocks are moved to the lower performance memory.

17 Claims, 4 Drawing Sheets

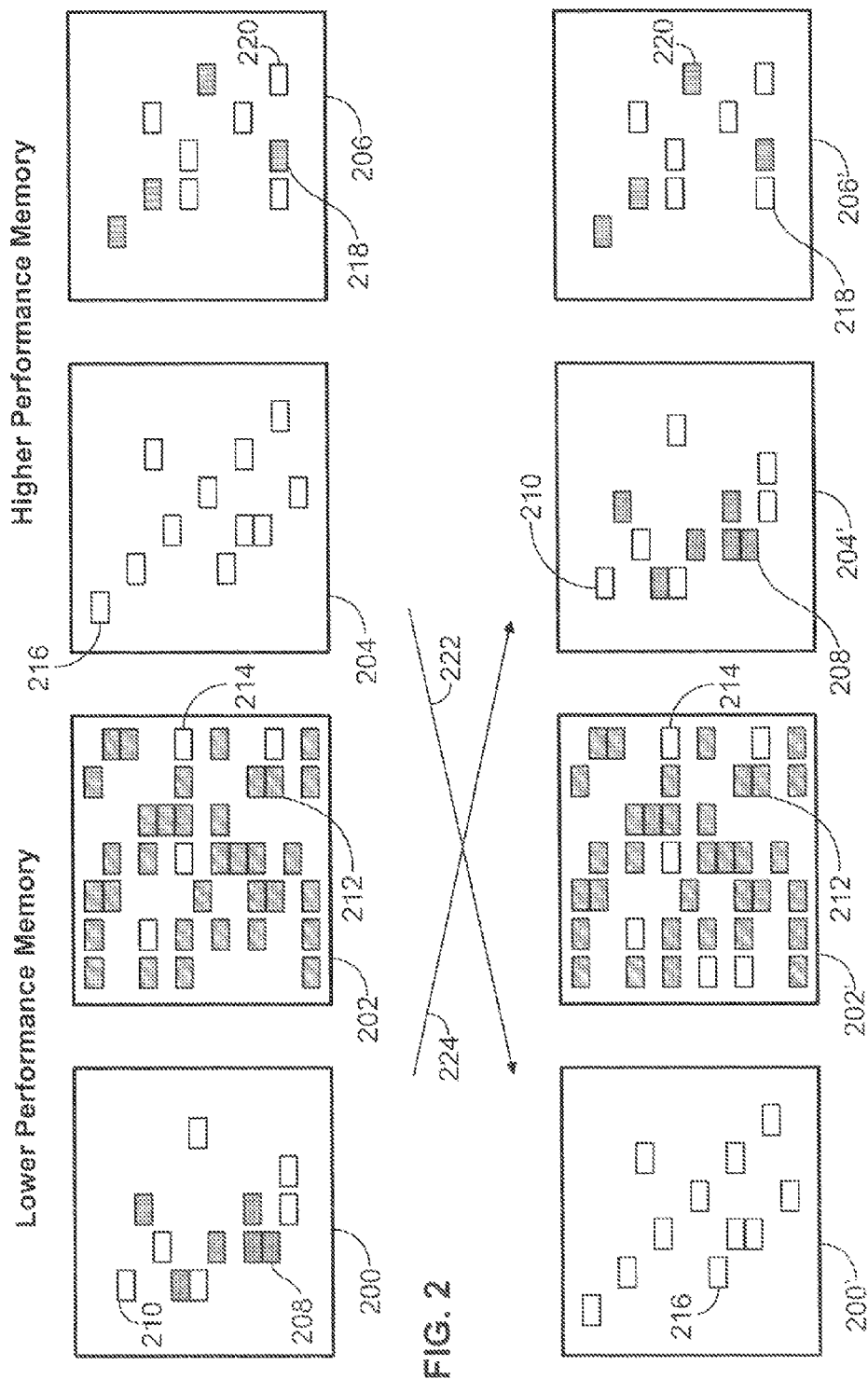

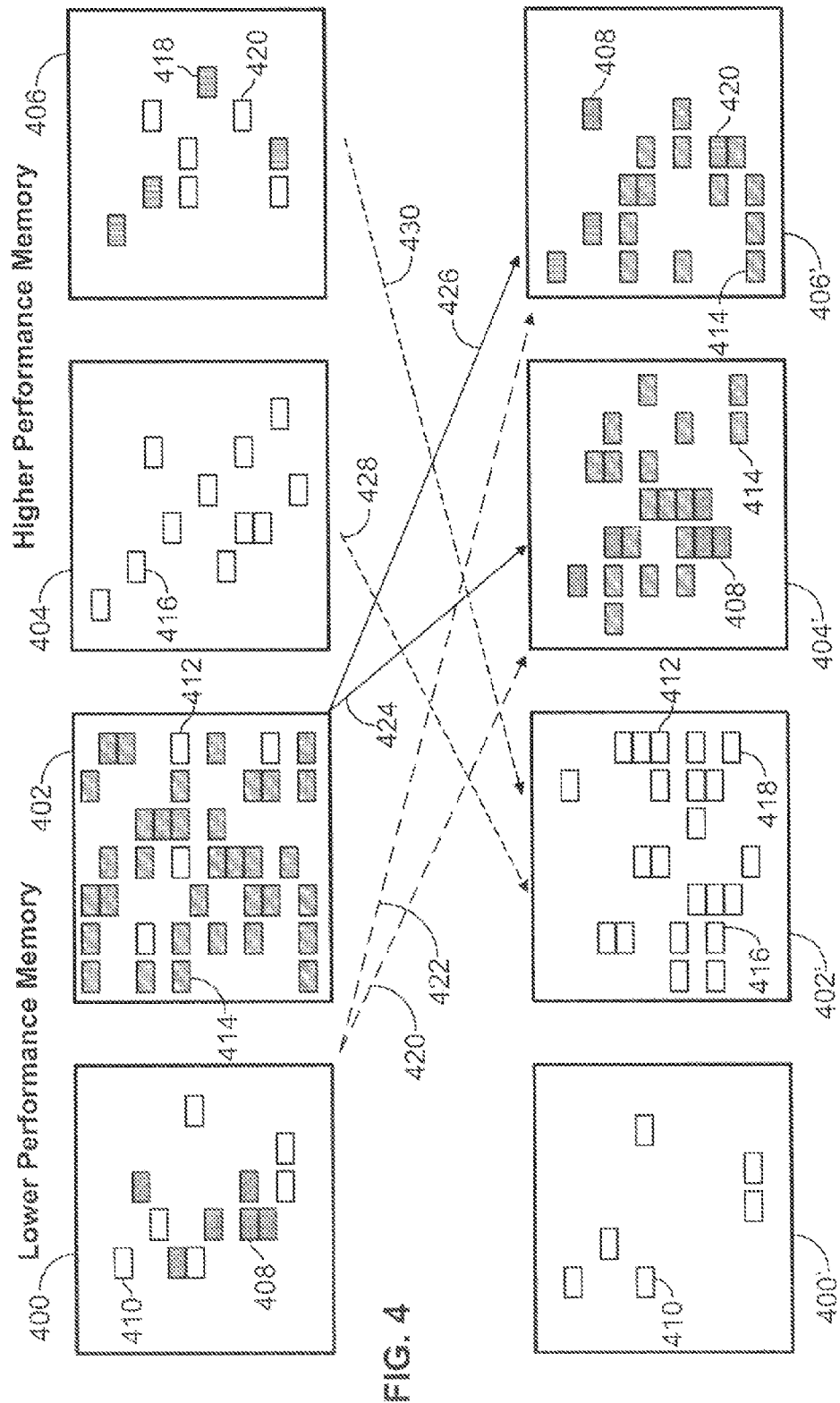

PROCESSOR WITH GARBAGE-COLLECTION BASED CLASSIFICATION OF MEMORY

FIELD OF THE INVENTION

The technical field relates to the field of memory management in a processor. More specifically, this invention relates to the field of using garbage collection utilities for improved memory management in a processor.

BACKGROUND

Information or data processors are found in many contemporary electronic devices such as, for example, personal computers, game playing devices and video equipment. Modern processors typically include several operational units including integer, floating point, and graphics units. Additionally, memory units, register files and on-chip caches (collectively, memory) are also provided for temporary or longer term storage of instructions and information. When a portion of memory is no longer used, a "garbage collection" utility may be used to reclaim the unused memory so that the memory can be reallocated to other tasks. For example, a conventional Java® virtual machine performs a periodic memory management technique called "garbage collection" in order to reclaim portions of memory that store object data that is no longer referenced by any objects in any currently running Java processes.

While a useful memory reclamation technique, the information traced (collected) by conventional garbage collection utilities have not been fully utilized and integrated into more comprehensive memory performance management in processors of conventional design.

BRIEF SUMMARY OF EMBODIMENTS OF THE INVENTION

A processor is provided having improved memory management by using garbage collection utilities. The processor includes higher performance memory units and lower performance memory units, and a memory management unit coupled to the higher and lower performance memory units. The memory management unit includes a garbage collection utility programmed to identify high use memory blocks and low use memory blocks within the higher and lower performance memory units. The memory management unit is also configured to move the high use memory blocks to higher performance memory and move the low use memory blocks to lower performance memory.

A method is provided for using garbage collection utilities for improved memory management in a processor. The method comprises determining performance characteristics of available memory to identify higher performance memory and lower performance memory. Next memory block use metrics are analyzed to identify high use memory blocks and low use memory blocks. Finally, high use memory blocks are moved to the higher performance memory while the low use memory blocks are moved to the lower performance memory.

BRIEF DESCRIPTION OF THE DRAWINGS

Embodiments of the present invention will hereinafter be described in conjunction with the following drawing figures, wherein like numerals denote like elements.

FIG. 2 is an illustration of exemplary memory pages prior to application of a memory management technique of the present disclosure;

FIG. 3 is an illustration of exemplary memory pages after application of the memory management technique of the present disclosure;

FIG. 4 is an illustration of exemplary memory pages prior to application of a second memory management technique of the present disclosure;

FIG. 5 is an illustration of exemplary memory pages after application of the second memory management technique of the present disclosure.

DETAILED DESCRIPTION

Figure 1:
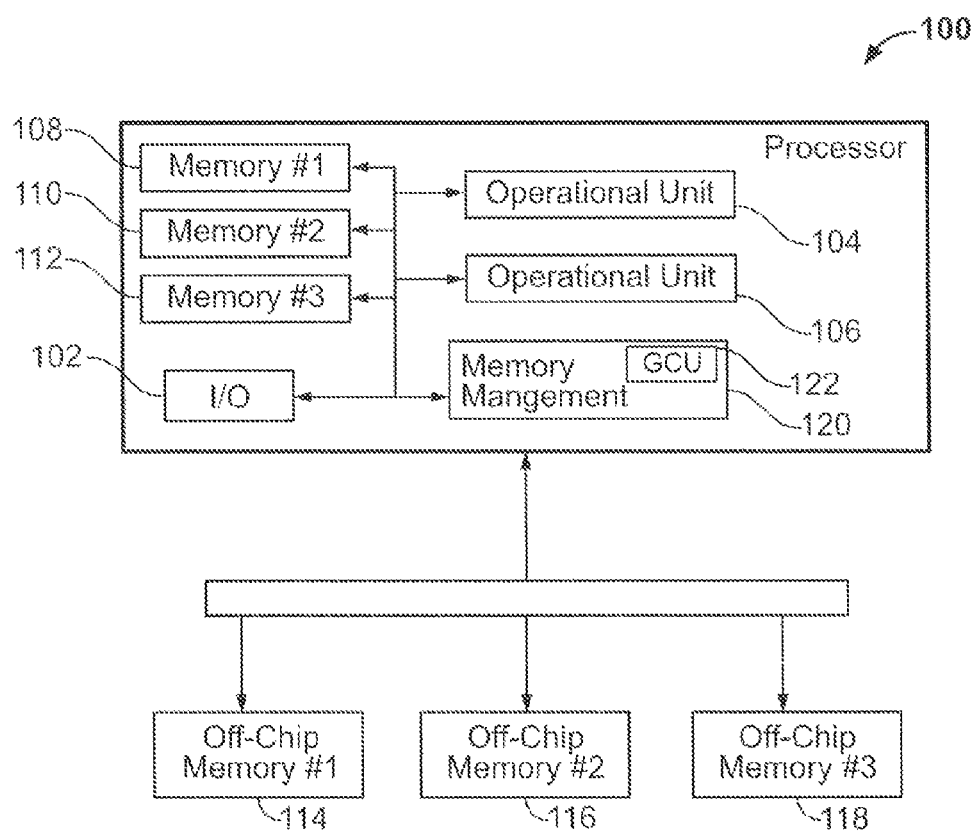
FIG. 1 is a simplified exemplary block diagram of processor suitable for use with the embodiments of the present disclosure.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular processor architecture.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to processor architecture and other functional aspects of a processor system (and the individual operating components of the system) may not be described in detail herein. Furthermore, the connecting lines shown in the various figures contained herein are intended to represent example functional relationships and/or physical couplings between the various elements.

Referring now to FIG. 1, a simplified exemplary block diagram is shown illustrating a processor 100 suitable for use with the embodiments of the present disclosure. In some embodiments, the processor 100 would be realized as a single core in a large-scale integrated circuit (LSIC). In other embodiments, the processor 100 could be one of a dual or multiple core LSIC to provide additional functionality in a single LSIC package. As is typical, processor 100 includes an input/output (I/O) unit 102 and operational units 104 and 106. These operation units may include floating-point units that performs the float-point computations, integer processing units for performing integer computations or graphics processing units performing various specialized graphic or imaging tasks.

The processor 100 may also include memory units 108-112 (known as "on-board" or "on-chip" memory) and may also include off-chip memory units 114-118. These memory units can be any type of memory, including, register files, various types of dynamic random access memory (DRAM) such as SDRAM, various types of static RAM (SRAM), and various types of non-volatile memory having a hierarchical (e.g., fast or slow) organization.

The memory units employed (available) in any particular implementation of the processor 100 are controlled by a memory management unit 120, which is responsible for keeping track of memory organization, allocation and reclamation. For example, each of the physical memory units 108-118 may be organized in various forms of logical memory, such as, memory pages containing memory blocks. When computer programs execute, memory is allocated for the tasks or threads of the executing programs, and reclaimed when those tasks or threads complete. Garbage collection (or a garbage collection utility) is an efficient form of memory reclamation that typically involves the use of a software routine that searches memory for areas of invalid or inactive data or information to reclaim the memory blocks storing that data or information for other use.

According to exemplary embodiments, the processor 100 includes a garbage collection utility 122. The garbage collection utility 122 may run as a separate task or process (e.g., as a software utility in one or more of the operational units 104 and 106) or in cooperation with the memory management unit 120. The memory management unit 120 may be realized in hardware, software or a combination of hardware and software in any particular implementation. Also, it will be appreciated that the garbage collection function of the memory management unit 120 may be distributed throughout the processor 100, including without limitation one, some or in each of the operational units 104 and 106. Non-limiting examples of garbage collection utilities include "tracing" garbage collectors (e.g., determining which data objects are in use, or may be put in use, and then discarding all remaining data objects) and "mark and sweep" garbage collectors (e.g., maintaining one or two bits with each data object to record whether it is in use (or may be put in use)). These garbage collection utilities may be activated (run) on a scheduled or event driven basis. Also, garbage collection utilities may be categorized by how they interact with an operating system, such as, for example: "stop-the-world" garbage collectors (e.g., completely halt execution of a program to run a memory reclamation cycle); "incremental" garbage collectors (e.g., interleaving memory reclamation with activity from a main program); and "concurrent" garbage collector (e.g., those that can concurrently reclaim memory in real time with a program). It will be appreciated that there are many ways of implementing a garbage collection utility, and the particular garbage collection utility 122 employed is not critical to achieving the advantages of the present disclosure. Basically, however realized in any particular implementation, the garbage collection utility 122 collects information (metrics) useful for achieving an efficient memory reclamation function. Such information includes, but is not limited to, the number of times the memory has been read, the frequency at which the memory has been read, the duration between access of the memory, known (or determined) data corruption characteristics of the memory, the number of memory blocks within a memory page that are currently storing invalid data, and the number of times a memory block has been erased or programmed. These metrics can be used to identify high use memory blocks and low use memory blocks in addition to memory blocks that can be reclaimed by the garbage collection utility.

Generally, each memory unit 108-118 has performance characteristics making it more or less suitable for various tasks. For example, non-volatile memory memories can provide not only the advantages of random access memories (RAMs) from/to which data can be freely erased/written, but also the advantages of read only memories (ROMs) which can store data even when power is cut off. Also flash memories consume less power than magnetic disc memory, provide faster access speed and are smaller in size. According to exemplary embodiments, the memory management unit 120 determines performance characteristics for each of the memory units 108-118. These performance characteristics are used for memory movement between the memory units to achieve higher processor performance by having the higher use memory blocks in higher performance memory and lower use memory blocks in lower performance memory. Performance characteristics for the memory units 108-118 include, but are not limited to: Memory latency (e.g., the number of cycles for a read/write operation); memory bandwidth (e.g., number of read/write cycles per unit time; memory power use; memory energy consumption; quality of service; fairness of memory (e.g., the absence of a priority order for memory access); memory reliability; and memory endurance (e.g., the number of times a memory may be written to). One or more of these performance characteristics may be used alone or in combination to classify a memory unit as higher performance or lower performance compared to some criteria or to each other memory unit as happens to be available. Additionally, it will be appreciated that multiple levels of memory performance may be classified in any particular implementation. For example, a highest performance level, a lowest performance level and any number of mid-performance levels.

Referring now to FIG. 2 and FIG. 3, illustrations are shown of exemplary memory pages prior to and after application of a memory management technique of the present disclosure. In FIG. 2, four memory pages 200-206 are shown. Memory pages 200 and 202 have been determined (or were known) to be of lower performance than memory pages 204 and 206. As a simple example, memory pages 204 and 206 may have reduced memory latency (i.e., are faster) than memory pages 200 and 202. Memory page 200 includes higher use memory blocks 208 and lower use memory blocks 210. Whether a memory block is considered to be of high use or low use may be determined by the garbage collection utility (122 of FIG. 1) during its normal operation. Similarly, memory page 202 includes higher use memory blocks 212 and lower use memory blocks 214, while memory page 206 includes higher use memory blocks 218 and lower use memory blocks 220. In this example, memory page 204 has only low use memory blocks 216.

According to exemplary embodiments, the memory management unit (120 in FIG. 1) analyzes or makes use of the information collected by whatever realization of the garbage collection utility (122 in FIG. 1) is implemented to move the memory of pages having the most high use memory blocks to higher performance memory and move the memory of pages having the most low use memory blocks to lower performance memory (which may or may not be the lowest performance memory available). FIG. 3 is an illustration of the result of this memory management technique. As can be seen, since memory page 204 had all low use memory blocks 216, those memory blocks have been moved (as indicated by arrow 222) from the higher performance memory page 204 to the lower performance memory page 200'. Also, since memory page 200 has more high use memory blocks than memory page 202 (six verses four in this example), the memory blocks 208 and 210 are moved (as indicated by arrow 224) from the lower performance memory page 200 to the higher performance memory page 204' (which may or may not be the highest performance memory available). Note that while memory page 202 and 206 have the same number of high use memory blocks (four each), memory page 202 has more low use memory blocks, and thus, memory page 206 has more memory blocks that may be allocated by the memory management unit (120 in FIG. 1). Accordingly, the memory blocks 218 and 220 remain in the higher performance memory page 206'.

Referring now to FIG. 4 and FIG. 5, illustrations are shown of exemplary memory pages prior to and after application of another memory management technique of the present disclosure. In this embodiment, memory block compacting is applied to the alignment of memory performance to high use memory blocks as discussed above in FIGS. 2-3. Using memory block compacting, the high use memory blocks of lower performance memory are moved to higher performance memory, while low use memory blocks of higher performance memory are moved to lower performance memory. In this way, complications due to memory fragmentation that occurs when there are many smaller non-contiguous high use memory blocks can be alleviated. Accordingly, FIG. 4 illustrates exemplary memory pages 400-406. Memory pages 400 and 402 have been determined (or were known) to be of lower performance than memory pages 404 and 406. Memory page 400 includes higher use memory blocks 408 and lower use memory blocks 410. As noted above, whether a memory block is considered to be of high use or low use may be determined by the garbage collection utility (122 of FIG. 1) during its normal operation. Similarly, memory page 402 includes higher use memory blocks 412 and lower use memory blocks 414, while memory page 406 includes higher use memory blocks 418 and lower use memory blocks 420. In this example, memory page 404 has only low use memory blocks 416.

In this embodiment, the memory management unit (120 in FIG. 1) analyzes or makes use of the information collected to move higher use memory blocks to higher performance memory and move lower use memory blocks to lower performance memory (which may or may not be the lowest performance memory available). That is, the high use memory blocks are compacted into pages of higher performance memory while low use memory blocks are placed in pages of lower performance memory. FIG. 5 is an illustration of the result of this memory management/compacting technique. As can be seen, some of the high use memory blocks 408 have been moved (as indicated by arrow 420) from the lower performance memory page 400 to the higher performance memory page 404', while other of the high use memory blocks 408 have been moved (as indicated by arrow 422) from the lower performance memory page 400 to the higher performance memory page 406' (which may or may not be the highest performance memory available). Also, some the high use memory blocks 412 have been moved (as indicated by arrow 424) from the lower performance memory page 402 to the higher performance memory page 404', while other of the high use memory blocks 412 have been moved (as indicated by arrow 426) from the lower performance memory page 400 to the higher performance memory page 406'. The low use memory blocks 410 of page 400 remain in lower performance memory as shown in memory page 400' and the low use memory blocks 414 of page 402 remain in lower performance memory as shown in memory page 402'. Additionally, the low use memory blocks 416 of page 404 have been moved (as indicated by arrow 428) to lower performance memory page 402' as have the low use memory blocks 418 of memory page 406 (as indicated by arrow 430). The high use memory blocks 420 of memory page 406 remain as shown in memory page 406' so that each of the higher performance memory pages 404' and 406' have high use memory blocks, while lower performance memory pages 400' and 402' contain low use memory blocks.

Figure 6:
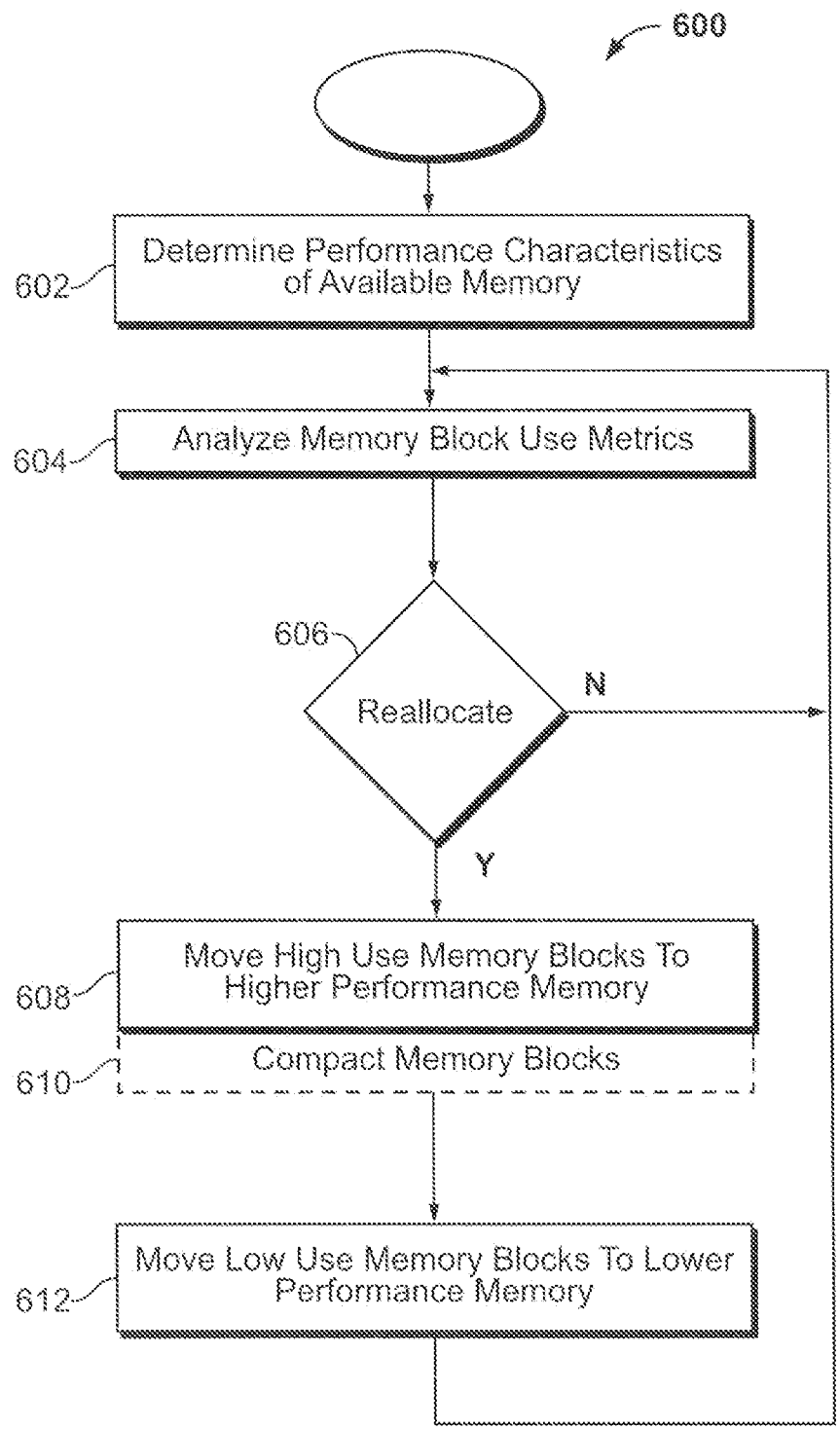
FIG. 6 is a flow diagram illustrating a memory management method according to the present disclosure.

FIG. 6 is a flow diagram illustrating an exemplary method 600 in accordance with the present disclosure. The routine begins in step 602 where a determination is made (for example by the memory management unit 120 in FIG. 1) of the performance characteristics of the available memory (108-118 in FIG. 1). As noted earlier, performance characteristics for the available memory include, but are not limited to: Memory latency (e.g., the number of cycles for a read/write operation); memory bandwidth (e.g., number of read/write cycles per unit time; memory power use; memory energy consumption; quality of service; fairness of memory (e.g., the absence of a priority order for memory access); memory reliability; and memory endurance (e.g., the number of times a memory may be written to). One or more of these performance characteristics may be used alone or in combination to classify a memory unit as higher performance or lower performance compared to some criteria or to each other memory unit as happens to be available. Next, in step 604, the memory use information (metrics) collected and use by the garbage collection utility (122 in FIG. 1) are analyzed to identify high use and low use memory blocks in various pages of memory. These metrics include, but are not limited to, the number of times the memory has been read, the frequency at which the memory has been read, the duration between access of the memory, known (or determined) data corruption characteristics of the memory, the number of memory blocks within a memory page that are currently storing invalid data, and the number of times a memory block has been erased or programmed.

Once available memory performance and present memory block use is known, decision 606 determines whether a reallocation or realignment of memory performance to memory use is needed. If so, the routine continues to step 608, where the high use memory blocks are moved to higher performance memory (see FIGS. 2-3). Optionally, step 610 also provides a compacting of the high use memory blocks into the higher performance memory (see FIGS. 4-5). Next, step 612 moves the low use memory blocks into the lower performance memory to complete the reallocation or alignment. Follow this, or upon a negative determination of decision 606, the routine returns to step 604 so that the method may be repeated to continue to move the high use memory blocks into the higher performance memory and low use memory blocks into the lower performance memory. Additionally (although not illustrated in FIG. 6), a conventional garbage collection memory reclamation may be employed to reclaim memory blocks to be used by other programs or tasks.

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational) unit of the present disclosure.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure as set forth in the appended claims and their legal equivalents.

What is claimed is:

1. A method, comprising:
   reclaiming memory using a memory garbage collection utility;
   determining one or more performance characteristics of available memory to identify higher performance memory and lower performance memory;
   analyzing memory block use metrics to identify higher use memory blocks and lower use memory blocks, wherein the analyzing comprises analyzing metrics collected by the memory garbage collection utility during the reclaiming operation; and
   moving one or more of the higher use memory blocks to the higher performance memory.

2. The method of claim 1, further comprising compacting memory blocks from one or more memory pages while moving the higher use memory blocks to the higher performance memory.

3. The method of claim 1, wherein determining further comprises identifying the higher performance memory and the lower performance memory using one or more of the following group of memory performance characteristics:
   latency;
   bandwidth;
   power usage;
   energy usage;
   quality of service;
   fairness; or
   endurance.

4. The method of claim 1, wherein analyzing further comprises identifying the higher use memory blocks and the lower use memory blocks using one or more of the following group of memory block use metrics:
   memory read count;
   memory read frequency;
   duration between memory access;
   data corruption characteristics;
   memory blocks storing invalid data;
   memory erase count; and
   memory programming count.

5. The method of claim 1, further comprising moving one or more of the lower use memory blocks to the lower performance memory.

6. The method of claim 5, wherein the method is repeated to move the higher use memory blocks to the higher performance memory and move the lower use memory blocks to the lower performance memory.

7. A method, comprising:
   reclaiming memory using a memory garbage collection utility;
   analyzing metrics collected by the memory garbage collection utility during the reclaiming operation to identify higher use memory blocks and lower use memory blocks; and
   moving one or more of the higher use memory blocks to memory having higher performance characteristics.

8. The method of claim 7, further comprising compacting memory blocks from one or more memory pages while moving the higher use memory blocks to the higher performance memory.

9. The method of claim 7, wherein moving the higher use memory blocks further comprises moving the higher use memory blocks to memory having higher performance of one or more of the following group of memory performance characteristics:
   latency;
   bandwidth;
   power usage;
   energy usage;
   quality of service;
   fairness or endurance.

10. The method of claim 7, further comprising moving one or more of the lower use memory blocks to the lower performance memory.

11. The method of claim 10, wherein moving the lower use memory blocks further comprises moving the lower use memory blocks to memory having lower performance of one or more of the following group of memory performance characteristics:
    latency;
    bandwidth;
    power usage;
    energy usage;
    quality of service;
    fairness; or
    endurance.

12. The method of claim 7, wherein analyzing further comprises identifying the higher use memory blocks and the lower use memory blocks using one or more of the following group of garbage collection utility metrics:
    memory read count;
    memory read frequency;
    duration between memory access;
    data corruption characteristics;
    memory blocks storing invalid data;
    memory erase count; and
    memory programming count.

13. The method of claim 7, wherein the method is repeated to move the higher use memory blocks to the higher performance memory and move the lower use memory blocks to the lower performance memory.

14. A processor, comprising:
   one or more higher performance memory units;
   one or more lower performance memory units; and
   a memory management unit coupled to the one or more higher performance memory units and the one or more lower performance memory units, the memory management unit comprising:
      a garbage collection utility configured to:
         reclaim memory; and
         collect metrics to be used to move memo blocks to corresponding memory units during the reclaiming operation; and
      a memory move unit configured to:
         analyze the metrics collected by the garbage collection utility to identify higher use memory blocks and lower use memory blocks; and
         move higher use memory blocks to higher performance memory.

15. The processor of claim 14, wherein the memory move unit is further configured to move the lower use memory blocks to lower performance memory.

16. The processor of claim 14, wherein the memory management unit is configured to compact memory blocks from one or more memory pages while moving the higher use memory blocks to the higher performance memory.

17. A device comprising the processor of claim 14, the device comprising at least one of a group consisting of:
   a computer;
   a digital book;
   a printer;
   a scanner;
   a television; or
   a set-top box.

* * * * *